Nov. 8, 1949 V. E. PRATT ET AL 2,487,671
PHOTOGRAPHIC APPARATUS EMPLOYING A SCANNING DEVICE
Filed Aug. 8, 1946 8 Sheets-Sheet 1

Fig. 1

INVENTORS
VERNEUR E. PRATT
GEORGE F. GRAY
BY
Van Deventer & Grier
ATTORNEYS

Nov. 8, 1949     V. E. PRATT ET AL     2,487,671
PHOTOGRAPHIC APPARATUS EMPLOYING A SCANNING DEVICE
Filed Aug. 8, 1946     8 Sheets-Sheet 3

INVENTORS
VERNEUR E. PRATT
GEORGE F. GRAY
BY

ATTORNEYS

INVENTORS
VERNEUR E. PRATT
GEORGE F. GRAY
BY
Van Deventer & Gier
ATTORNEYS

Nov. 8, 1949 V. E. PRATT ET AL 2,487,671
PHOTOGRAPHIC APPARATUS EMPLOYING A SCANNING DEVICE
Filed Aug. 8, 1946 8 Sheets-Sheet 7

INVENTOR.
VERNEUR E. PRATT.
GEORGE F. GRAY.
BY
ATTORNEYS.

Patented Nov. 8, 1949

2,487,671

UNITED STATES PATENT OFFICE 2,487,671

PHOTOGRAPHIC APPARATUS EMPLOYING A SCANNING DEVICE

Verneur E. Pratt and George F. Gray, Norwalk, Conn.

Application August 8, 1946, Serial No. 689,281

17 Claims. (Cl. 88—24)

The co-pending application Serial Number 628,540, filed November 14, 1945, discloses a method of photography employing a scanning camera having a movable film and a scanning mirror moved in timed relation to the movement of the film which scans the copy to be photographed. The scanning unit has a motor which continuously rotates the mirror and control mechanism for determining how much of the total copy area is scanned during such complete revolution of the mirror.

The method disclosed in said application is that of scanning the object to be photographed with a scanning member adapted to reflect a flowing image of said object through a lens, whereby the latter progressively impresses said reflected image upon a moving photo-sensitive element.

The instant application is directed to an apparatus for practicing said method and discloses a camera which can also be used as a projector or enlarger and which, therefore, has a large field of usefulness especially in the microfilm field for which it is particularly adapted.

The invention also discloses the use of a suitable clutch between the scanning mirror, or optical beam deflecting member, and its motor (as distinguished from the direct-connected arrangement disclosed in the aforesaid application) one of the objects of which is to enable the mirror to be returned to its initial position after each scanning sweep. This arrangement has certain advantages which will be apparent from the following specification, among which is the advantage that the mirror is released to the action of a spring which returns the mirror to a definite starting position after each scanning operation.

Another object is the provision of a scanning device in which a mechanically operated clutch may be employed and which is self-controlling once its scanning cycle of operation has been pre-selected.

Another object is the provision of a scanning device in which a single-revolution clutch is employed making possible the elimination of the camera shutter by employing the mirror holder to cut off light from the mirror as presently described.

A further object is to provide improved control heads for use with various species of clutches employed in scanning devices such as those herein disclosed.

The following specification and drawings describe by way of illustration preferred embodiments of the invention, it being understood that the details of construction of the parts are given merely for illustrative purposes and are not to be considered as limitations as they may be varied within wide limits without, however, departing from the scope of the appended claims.

The camera-projector head or optical instrument used with the apparatus disclosed herein may be of any suitable type such, for example, as that shown in the co-pending application Serial Number 547,131, filed July 29, 1944, and entitled "Photographic devices," now Patent No. 2,478,980 of August 16, 1949.

Figure 1:
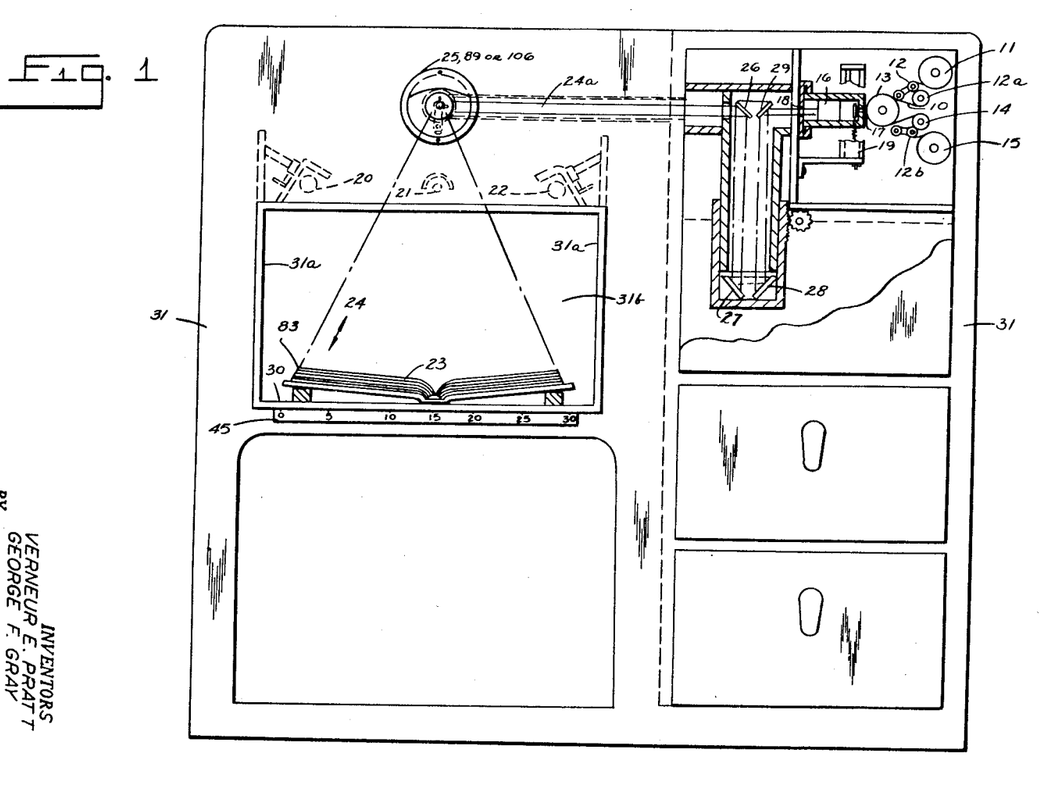
Figure 1 is a front view of a camera-projector embodying this invention.
Figure 8:
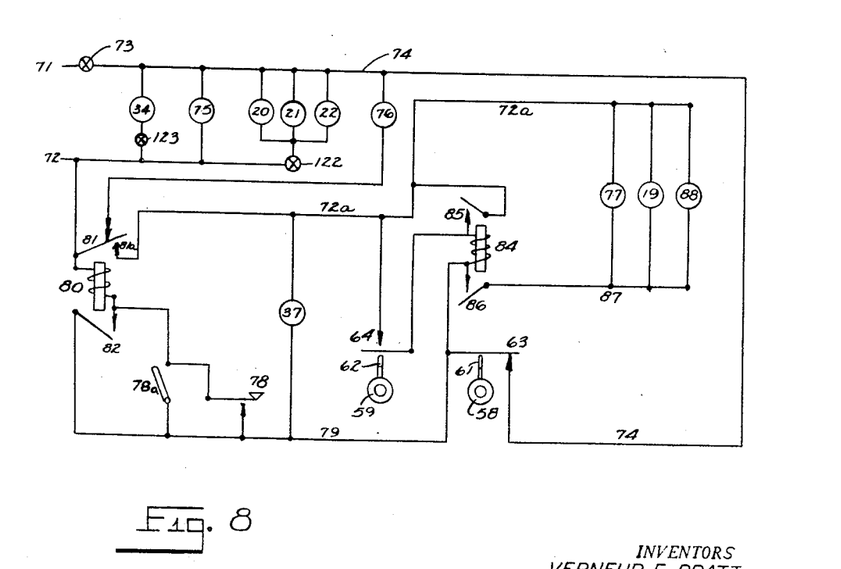
Figure 8 is a wiring diagram of the apparatus shown in Figure 1 with the scanning device of Figure 2 or Figure 9.
Figure 20:
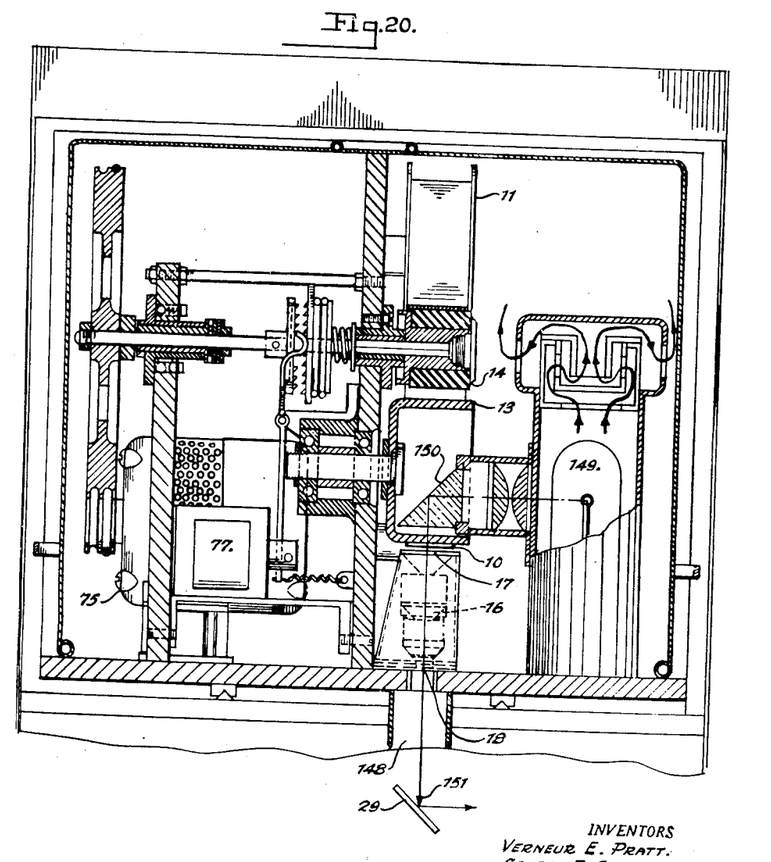
Fig. 20 is a sectional view of the camera head used in the apparatus herein described.

Briefly described, referring to Figure 1, such a camera-projector when used as a camera, has a film 10 wound off delivery reel 11, over guide rollers 12, 12a carried around the transparent drum 13, over drive roller 14 driven through a clutch by a motor (the clutch and motor are not shown in Figure 1 but are shown in Figures 8 and 20), over guide roller 12b and finally wound up on take-up reel 15.

A lens 16 is positioned in front of the film. Suitable slits 17, 18 may be associated with said lens to define the optical path thereof.

A suitable shutter mechanism 19 preferably electrically operated is placed so that it can be operated as hereafter described, to cut the optical path of the lens. A suitable shutter is shown in the co-pending application Serial Number 628,540, filed November 14, 1945, entitled "Scanning camera."

Lamps 20, 21, 22, illuminate the copy such as the book 23 and the light reflected therefrom passes upward along path 24 to the scanning mirror in a scanning device generally denoted by the numeral 25, is reflected along the path 24a, to mirror 26, to mirror 27, to mirror 28, to mirror 29 and to the lens 16 and to the film 10 which receives the image. The mirrors 26, 29 and 27, 28 are relatively adjustable to vary the length of the optical path between the lens 16 and copy support 30 which feature forms the subject matter of a co-pending application for patent, so is not here claimed.

The mirror in scanning device 26 and the film 10 are moved in timed relation as hereinafter described so that as the miror moves to scan the stationery copy, an image thereof is flowed onto the film. When used as a projector, the copy is replaced by a suitable light sensitive medium such as photographic paper laid flat upon the support 30 and the film 10 is a film containing the images to be printed on the paper.

The camera projector head located in the upper drawer of the cabinet Figure 1 may be, as previously stated, of the type shown in the co-pending application Serial Number 547,131, filed on July 29, 1944, wherein a light source is shown which projects a beam of light through the wall of the transparent drum 13 (as more fully described and illustrated in application Serial Number 547,131 before mentioned) and through the film 10 thereon. The emergent beam from the lens travels in a reverse path from that just described and, as the film and mirror move, the enlarged image, as hereinafter described, is projected downward and flowed on the paper.

Referring to Fig. 20, the camera head therein shown is arranged so that the aperture 148 is drawn 90 degrees from the position shown in this figure to face the mirror 29 so that the light from the lamp 149, passes prism 150 and through the wall of the transparent drum 13, the film 10 thereon, through slit 18 (if the slit is used) and via the path shown at 151 and to the mirrors 29, 28, 27, 26, to the light path 24a as seen in Fig. 1 and to the mirror in the scanning device 25 whereby the projected image from film 10 is projected downward in path 24 and flowed on the sensitized paper on support 30.

The various parts just described are mounted in a suitable support such as cabinet 31, as more fully described in the application Serial Number 628,540 aforesaid.

As the instant application is directed mainly to the construction and arrangement of the scanning device per se, only sufficient details of the other parts of the apparatus are given herein to enable the instant invention to be understood, reference being made to the aforesaid applications for details of the other apparatus not herein described in detail.

Figure 2:
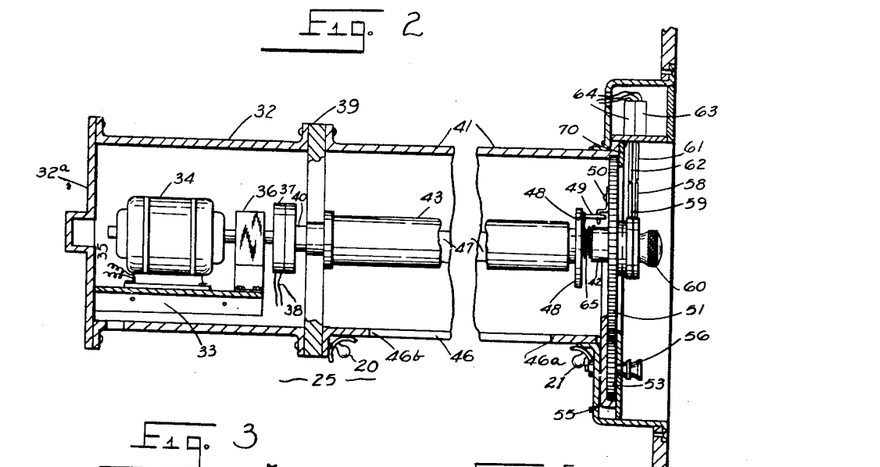
Figure 2 is a longitudinal view, partly in section, of a scanning device which may be used in the apparatus shown in Figure 1.

Referring to Figure 2 in which one form of scanning device is shown, there is a casing 32 forming a support and having a bracket 33 therein supporting a synchronous motor 34 connected via wires 35 to the circuit to be presently described. The motor shaft is connected to a reduction gear 36, the shaft of which is connected in turn to the driving member of a magnetic clutch 37, which by wires 38 connects to the circuit to be presently described. A head 32a closes the rear end of the casing.

A central partition 39 closes the front end of the casing 32 and forms a bearing support for the driven shaft 40 of the clutch 37 which extends through the forward part 41 of the casing and is supported in a bearing 42 in the front end thereof.

Shaft 40 supports within the forward portion 41 of the casing, a mirror holder 43 supporting a mirror 44 which acts as an optical beam-deflecting means and in operation scans the area of support 30 from "0" on the left to "30" on the right, as shown on scale 45. The mirror may be as long as the support 30 is deep—say 15 inches. The total area of the space scanned thereby (if the scale 45 is in inches) would be 15 x 30 inches. The mirror may be ½ to 1 inch wide or of any suitable width, and only long enough to receive the optical beam at that point.

Figures 3, 4:
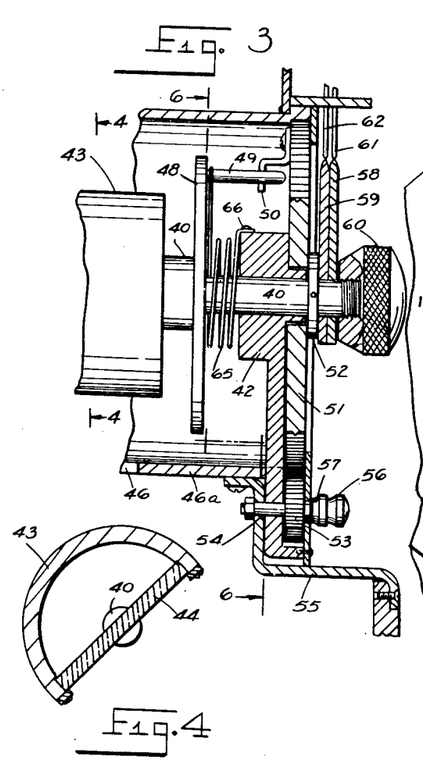
Figure 3 is an enlarged view of the right hand end of Figure 2.
Figure 4 is a sectional view on the line 4, 4 of Figure 3.
Figure 5:
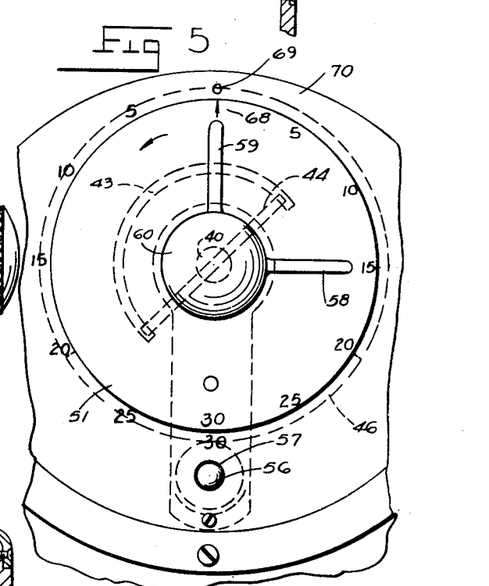
Figure 5 is a front view of the control head of the device of Figure 2.

The underside of the casing 41 is cut away as indicated at 46 so that the mirror can scan anything on support 30 such as the book 23, and has an opening 47 in a side wall to permit the optical path 24a to extend between the mirror 44 and the lens 16. The control head for the device Figure 2 is best shown in Figures 3 and 5.

A disc 48 is secured to shaft 40 to turn therewith and has a pin 49 projecting therefrom which rests against a stop 50 secured to a plate 51 having a toothed edge, said plate being supported free to turn on a forwardly extending boss on bearing 42.

The shaft 40 extends outwardly through bearing 42 and has a collar 52 secured thereto, which collar holds plate 51 loosely against the outer end of bearing 42. A gear 53 is meshed with the teeth on plate 51 and is secured to the stub shaft 54 secured to the casing member 55.

The outer end of shaft 54 has secured thereto a knob 56. By turning this knob, gear 53 will revolve plate 51, and by means of lock nut 57 the plate can be locked in any desired position for a purpose to be presently described.

Fingers 58, 59 are loosely supported on the outer end of shaft 40 so as to be movable thereabout, and these fingers can be adjusted to any desired position relative to plate 51 and secured in such position by tightening nut 60 on the threaded end of shaft 40 as best seen in Figure 3.

Fingers 58, 59 when they revolve engage the actuating members 61, 62 respectively of the control switches 63, 64 mounted immediately above the fingers as shown in Fig. 2.

Figure 6:
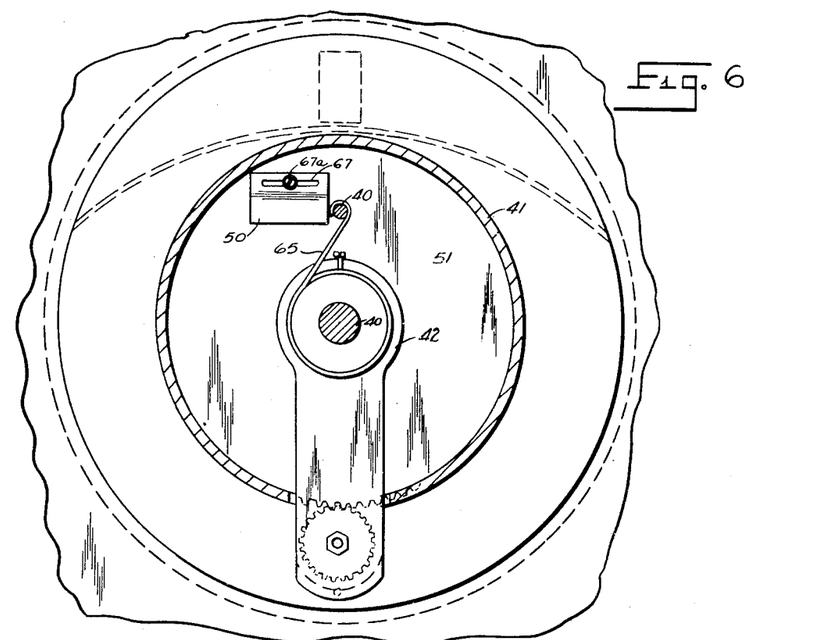
Figure 6 is a sectional rear view of the control head of the device of Figure 2 taken on the line 6—6 of Figure 3.

A spring 65 has one end secured at 66 on bearing 42 or to some other stationary part of the device and is coiled about shaft 40 and its free end hooked over pin 49 or otherwise secured to the mirror holder or frame 43 so as to always urge said holder and its connected parts including shaft 40 and fingers 58, 59 in a clockwise direction so that when the clutch 37 is released and the motor 34 disconnected from the shaft 40, the pin 49 will lie against the stop or abutment 50. The stop 50 is made adjustable relative to plate 51 by providing same with a slot 67 for screw 67a Fig. 6, by which the stop is secured to the plate.

Figure 8 is a wiring diagram of the apparatus previously described. Assuming it is desired to scan the first 15 inches of copy on support 30—that is to say, the left hand page of book 23—the plate 51 having arrow 68 thereon is set at "0" indicated by the numeral 69 on the face 70 of the casing by turning knob 56 and tightening nut 57.

The starting finger 59 is now set slightly to the right of the arrow 68 and the stop-finger 58 is set at "15" on plate 51 and the knob 60 tightened to hold both fingers locked to shaft 40 to revolve therewith.

Wires 71, 72 being connected to a suitable source of current, and main switch 73 being closed, current will flow via conductor 74 to the motor 34 of the scanning device 25 to the camera motor denoted by the numeral 75 (a synchronous motor) and to lamps 20, 21, 22. The lamps will be illuminated to illuminate the copy 23, and signal lamp 76 will also light, and the motors will revolve, but the clutch 37 for the scanning device is not closed so the mirror 44 does not move; nor is the camera clutch, denoted by the numeral 77, located between the camera motor 75 and the film drive roller 14 closed, and the film is not in motion.

If the push button switch 78 is pressed to momentarily close its contacts, a circuit is established from main conductor 74 through the normally closed contacts of stop-switch 63, via conductor 79, through contacts of switch 78, through winding of relay 80 to main conductor 72.

Relay 80 closes its contact arms 81, 82, and remains closed when switch 78 is released. The following transpires:

(a) The circuit through signal lamp 76 is broken;

(b) The conductor 72 is extended via conductor 72a to the clutch 37 of the scanning device, and said clutch is operated to close, and mirror 44 begins to move shaft 40 revolving anticlockwise in Fig. 5.

(c) The pre-setting of the plate 51 with arrow 68 thereon to "0"—(69) has positioned the mirror to pick up the beam reflected from the copy beginning at the left of copy 23 slightly to the left of the point 83 on said copy, so that when starting finger 59 revolving counterclockwise with shaft 40 reaches "0" (arrow 68) on the plate, the mirror 44 has just started to scan the left hand edge 83 of the copy.

(d) At this point starting finger 59 operates actuating member 62 of switch 64 which momentarily closes its contact while the finger continues to rotate. A circuit can now be traced from main conductor 74 via closed contacts on switch 63, through relay 84, through contacts on switch 64 to conductor 72a, contact 81a on relay 80 and via arm 81 thereof to main conductor 72.

(e) Relay 84 locks itself in closed circuit position as its contacts 85 close, as it is then bridged across the main circuit 74, 72. Switch 64 can, therefore, be a passing-contact switch and need not be held with its contacts closed during the rest of the cycle.

(f) As relay 84 closes contacts 86, a circuit is established from main conductor 74, via closed contacts on stop-switch 63, via contacts 86, to conductor 87, to the camera clutch 77, shutter mechanism 19 and signal lamp 88, and from these via conductor 72a and the contacts 81, 81a of relay 80, to main conductor 72. The shutter 19 is operated to open the optical path to the film.

(g) Camera clutch 77 connects the film feeding mechanism to the camera motor 75, and the film 10 is moved past the back focus of the lens in timed relation to the sweep of mirror 44 over the copy, and in the proper direction.

(h) When the mirror 44 has scanned the copy to the point "15" on scale 45, stop finger 58, which has been revolving anticlockwise (Fig. 5) evenly spaced behind finger 59 in its path of travel, has reached the arrow 68 on plate 51, operates the actuating member 61 of switch 63 which opens its contacts. The following now occurs:

Relay 84 opens all its contacts opening the camera clutch and stopping movement of the film 10.

Signal lamp 88 is extinguished.

The shutter 19 closes and shuts off all light to film 10.

Relay 80 opens its contacts and signal lamp 76 is illuminated.

Clutch 37 in the scanning device 25 opens and the mirror 44 stops moving counterclockwise.

When the mirror 44 is moved during the scanning operation, as plate 51 and stop 50 thereon remain stationary, the pin 49 of the mirror assembly leaves the stop and travels away from the latter against the tension of spring 65; therefore, when clutch 37 releases the shaft 40 of the mirror assembly, the spring 65 returns the assembly to its initial starting position where pin 49 is resting against stop 50 as shown in Figures 2, 3, 6, and 7.

Because of this provision to return the mirror 44 to its initial starting position after it has completed a scanning operation instead of causing the mirror to make a complete revolution to return to starting position, the mirror can be set to scan any fraction of the support 30 in the focal plane of the lens 16.

For example, suppose it is desired to scan from "20" to "30" on scale 45:

The plate 51 is set with its arrow 68 on "20" on the casing 70.

The starting finger 59 is set at "20" on plate 51.

The stop finger 58 is set on "30" on plate 51.

The device will now operate as previously described in connection with scanning from "0" to "15." The film will not start to move until the scanning beam is at "20" and will stop when the beam has scanned to "30." The mirror 44 will be returned to the starting point at "20" on scale 45 as the stop 50 on plate 51 has been pre-set at that point, and spring 65, always returns the mirror assembly to the pre-set point.

Figure 7:
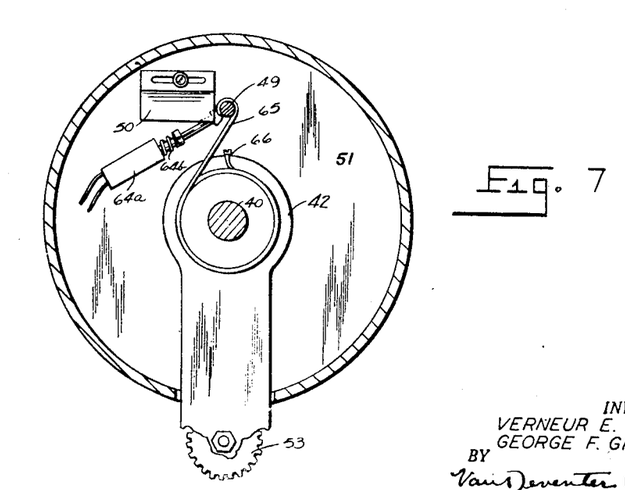
Figure 7 is a sectional view of modified form of the control device shown in Figure 2.

Figure 7 shows a modification of the scanning device just described, in that the starting switch 64 of Fig. 8 may be located on the rear of plate 51 as shown at 64a, Fig. 7, where it may be held with its contacts open by the pressure of pin 49. When the device operates, as previously described, and pin 49 moves away from the switch, spring 64b forces the switch to closed circuit position and the operation is the same as previously described. When spring 65 returns the pin 49 to the stop 50, the pin restores switch 64a to normal position.

When this arrangement is used, starting finger 59 can be omitted as it is no longer necessary, the function and pre-setting of the starting switch being determined by the setting of plate 51 and the operation of pin 49 as just described.

Figures 9, 9A, 10:
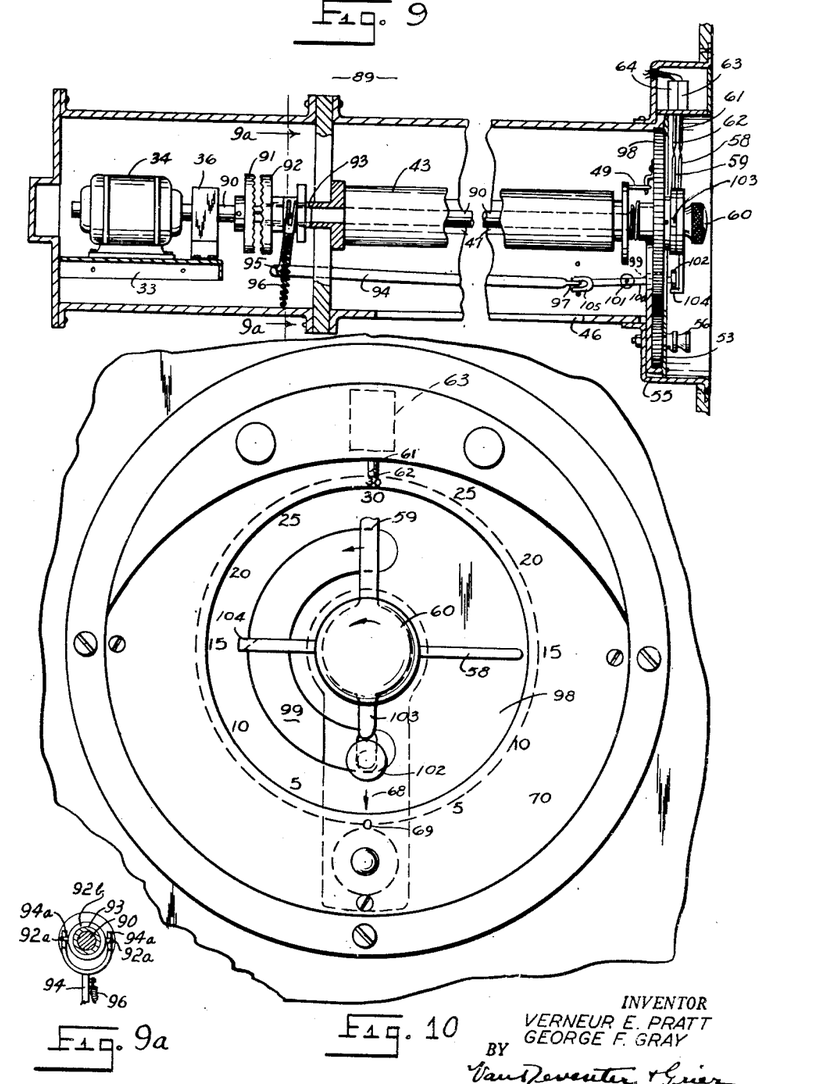
Figure 9 is a longitudinal view partly in section, of an alternate form of scanning device that can be used in the apparatus, Figure 1, instead of the device shown in Figure 2.
Figure 9a is a sectional view on the line 9a, 9a of Figure 9.
Figure 10 is a front view of the control head of the device, Figure 9.

Figs. 9, 9a and 10 illustrate an alternate form scanning device generally denoted by the numeral 89. This differs from the device 25 of Fig. 2 in that a mechanically actuated clutch is employed and the operation of the control mechanism is somewhat different.

The motor 34 and the gear reduction 36 are the same as heretofore described. The shaft 90 from the slow speed side of the device 36 extends entirely through the scanning device and is threaded on its outer end to receive the knob 60.

Secured to shaft 90 is the driving member 91 of a clutch. The driven member 92 of this clutch is mounted to rotate with a splined sleeve 93 on which it can be moved longitudinally into and out of engagement with the driving member 91.

Sleeve 93 is freely revolvable about shaft 90 but may be supported thereby. The mirror assembly consisting of the holder 43 and mirror 44 are secured to and move with sleeve 93.

An L-shaped yoke 94 is pivoted on the casing 95 and has an over-center spring 96 tending to hold the yoke in either one of two operative positions. When the lever end 97 of this yoke is moved downward, the yoke moves the clutch member 92 out of engagement with the driving member 91 thereof, the spring 96 being over center with its top to the right as shown.

When the yoke lever is moved upward by the action of cam nose 104 of the stop finger 58 as presently described, the clutch member 92 is moved longitudinally into engagement with the driving member 91 of the clutch, the spring 96 being over center with its top to the left.

The upper ends of the yoke are slotted, as shown at 94a and engage the pins 92a which project from a collar 92b held in a groove in the neck of the driven member of the clutch 92. It will be observed that the forked ends 94a of the yoke will engage the pins 92a to move the spline clutch member 92 into and out of engagement with the driving member 91 of the clutch as previously described.

The showing is diagrammatic, as any suitable form of mechanical clutch can be used.

The plate 98 performs the same function in this form of scanner as the plate 51 in the scanner Fig. 2. Plate 98 has an arcuate slot 99 therein, through which projects a lever arm 100 pivoted at 101 on a stationary part of the casing. The outer end of arm 100 carries a roller 102 adapted to be depressed by the cam nose 103 of start finger 59 and elevated by the cam nose 104 of stop finger 58.

The inner end 105 of the lever arm 100 engages and moves the lever end 97 of the clutch yoke and thereby engages and disengages the clutch 91—92.

In Figure 9 the clutch is shown in the disengaged position, cam nose 104 of the stop finger 58 having elevated roller 102, and thereby moved the levers 100 and 94 so that the spring 96 is over center to the right, thereby holding the longitudinally movable driven member of the clutch out of engagement with the driving member 91 thereof. In this condition the neck of the lever 100 where it passes through the arcuate slot 99, rests against the inner edge of said slot, and the lever 100 carrying the roller 102 is held in the position shown in the figure by lever 94 and spring 96.

When the cam nose 103 of the revolving start finger 59 engages the roller 102, it pushes same downward, which action via levers 100 and 94 throws the spring 96 over center to the left in Figure 9. The forked upper ends 94a of the yoke engage the pins 92a in the ring 92b. The ring forces the clutch member 92 to the left thereby causing same to engage the driven member 91 of the clutch. Ring 92b permits the driven member 92 of the clutch to revolve freely to drive the sleeve 93 carrying the mirror which operates as previously described.

When the roller 102 is depressed as just described, the neck of the lever 100 passing through the arcuate slot 99 rests against the outer edge of the slot and is held in this position by the lever 94 and spring 96.

The operation of setting the control head Figure 10 is much like the operation described in connection with Figures 3 and 5. Assuming it is desired to scan from "0" to "15" on scale 45, the plate 98 is set and locked (as previously described in connection with plate 51) with the arrow 68 at "0" (69) on the casing 70. This pre-sets the mirror 44 at starting position, as previously described.

Start-finger 59 is now set so that the cam nose 103 of same is slightly to the left of the roller 102 of the clutch control. This brings the finger 59 slightly to the right of the actuating member 62 of starting switch 64.

Stop-finger 58 is now set with its cam nose 104 at "15" on the casing 70.

The start and stop-fingers so set are locked to the shaft 90 to rotate therewith by tightening nut 60.

Referring to Fig. 8, the main switch 73 and push button 78 being closed, motor 34 is energized as previously described, and rotates shaft 90. This revolves fingers 58, 59, anticlockwise in Figure 10 and the cam nose 103 depresses roller 102 and through the levers 100 and 94 operates clutch 91, 92 and the mirror 44 is moved to scan the space "0" to "15" on scale 45.

At the beginning of the scanning operation, the finger 59 has operated switch 64, as previously described, to start the camera in operation.

At the end of the scanning operation, the cam nose 104 lifts the roller 102 and operates the clutch to stop the movement of the mirror. At the same time the stop-finger 58 has operated stop-switch 63 to open the camera clutch 77 and close the shutter 19 and, while the motor 34 and shaft 90 continue to move in their path over plate 98, no photographs are made until the switch 78 is again closed, as the release of relay 80 opens the current supply to the camera clutch 77 and shutter 19 at 81—81a and same is not restored until relay 80 is operated by again closing switch 78.

It will be obvious that switches 63, 64 are "dead" unless relay 80 has closed its contacts.

The magnetic clutch 37 shown in Figure 8 is, of course, omitted from the circuit when the mechanical clutch shown in Figure 9 is employed.

Figures 11, 12, 13:
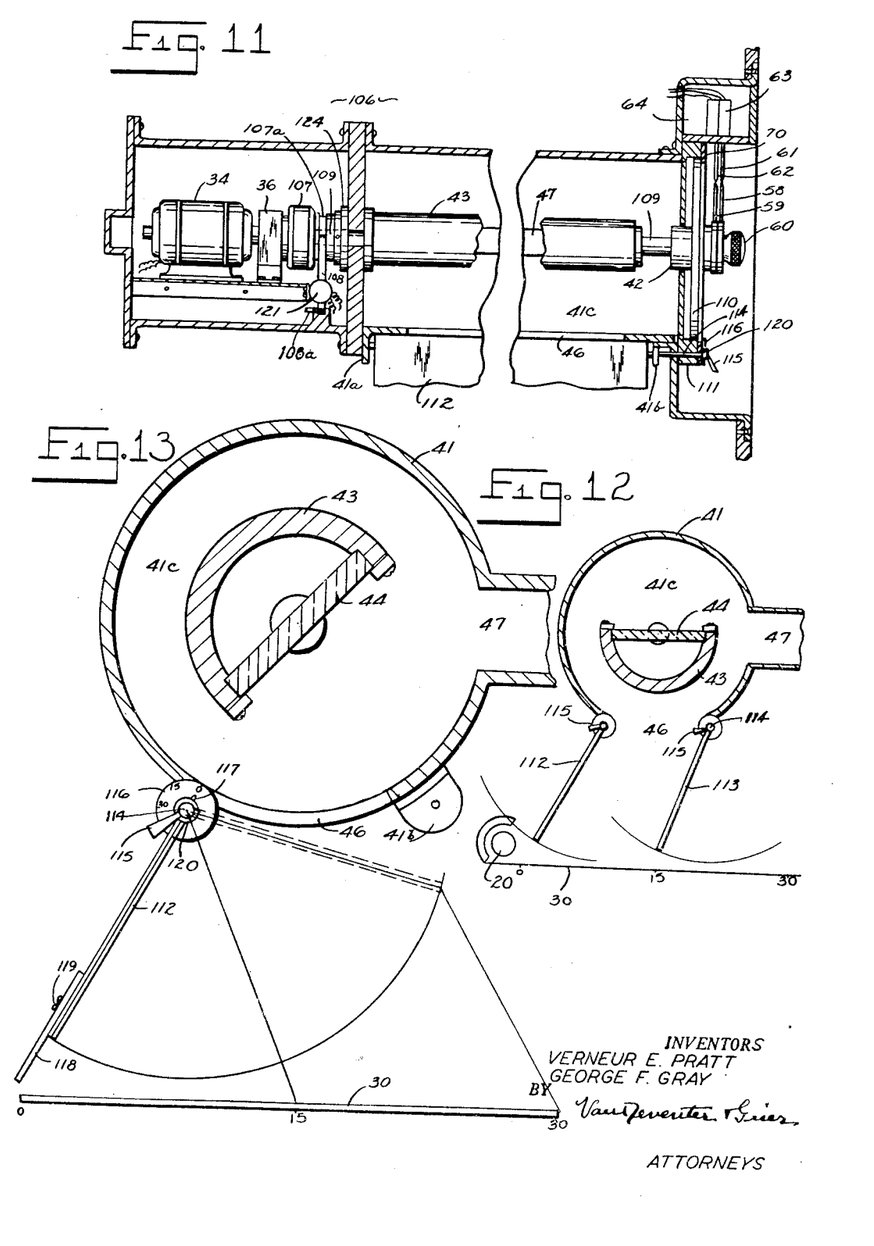
Figure 11 is a longitudinal view partly in section of an alternate form of scanning device that can be used in the apparatus Figure 1 instead of the device shown in Figure 2.
Figure 12 is a diagram of the starting or "at rest" position of the mirror in the device Figure 11 and the baffle plates used therewith.
Figure 13 is a diagram showing how the baffle plates of Figure 12 are adjusted.

Figure 11 illustrates an alternate form of scanning device generally denoted by the numeral 106. This differs from the device 25, Figure 2, or the device 89, Figure 9, in that a single revolution clutch that may be manually or electrically controlled may be employed, and the operation of the control mechanism or "head" is somewhat different from the control heads previously described.

As can be seen from Figure 11, many of the parts of this device are the same as those shown in the preceding figures so they will not be described.

The motor 34 operates through gear reduction 36 to drive the driven member of a single-revolution clutch 107 of any suitable construction—such, for example, as commonly used on punch presses or the like.

Such clutches have a trip lever 108 which, when operated to connect the driving and driven members of the clutch, permit the driven member to make one complete revolution only, whereupon 108 reengages and the clutch is stopped with the driven member in its original or starting position.

The shaft 109 is connected to the driven member of the clutch and carries the mirror frame or holder 43 and mirror 44. Normally the mirror lies in the position shown in Figure 12 so that the frame 43 acts as a light shield or guard between the optical paths 24, 24c, of Fig. 1, or 46, 47 of Fig. 11.

The shaft 109 is supported in front bearing 42 and outside this bearing a plate 110 surrounds the shaft but does not turn with it, said plate being fixed to the front 111 of the casing.

The plate 110 is marked "0" to "30" similar to plate 51, Figure 5, and for the same purpose, viz: these markings correspond to "0" to "30" on scale 45 and denote the longitudinal area scanned by the mirror 44 in a complete sweep across the support 30.

The outer end of shaft 109 is threaded to receive the knob or nut 60 and this nut holds the fingers 58, 59 in various adjusted positions about the shaft 109, as previously described, in connection with the preceding figures. These fingers operate switches 63, 64, as previously described.

The casing 41 has at each edge of the lower opening 46 thereof (which is sufficiently wide to permit the mirror 44 to scan the support 30 from "0" to "30") baffles or flaps 112, 113, each flap being hung in ears 41a, 41b, extending from the casing as best seen in Figure 11. A rod 114 for each flap extends outwardly through casing 111 and has a handle 115 secured thereto. A dial 116 is provided adjacent a pointer 117 on the handle and is graduated "0" to "30" corresponding to scale 45, the graduations on dial 116 indicating when the flaps are located to define the optical path at the corresponding point on the support 30.

For example, referring to Figure 12, the baffle 112 defines the left hand or starting edge of the field at "0" on support 30, and the baffle 113 defines the right hand edge of the field being scanned at "15" on support 30; therefore, the only area the mirror can "see" to scan is the first 15 inches of the copy from "0" to "15" on scale 45.

Assuming baffle 112 was moved to "15" on dial 116, its lower end would be at "15" on support 30, and if baffle 113 was moved to "30" on its dial 116, its lower end would be at "30" on support 30, and the area scanned would be 15 inches long beginning at "15" and ending at "30" on scale 45.

The lower edges of the baffles are made adjustable in any suitable manner such as by extensions, one of which is shown at 118, Figure 13, which may be slotted and attached to the baffle 112 by thumb screws 119 in a manner that will be obvious. The baffles may, therefore, be brought down into actual contact with any part of the copy on support 30 to define the area thereof to be scanned. Lock nuts 120 are provided to lock the baffles in any set position.

Obviously the baffles may be used with any form of scanning device, but are particularly useful with the form shown in Figure 11 for reasons hereafter mentioned.

When the baffles 112, 113 are employed in a camera, the lamps 20, 22 which may be tubular lamps, are brought down toward the support 30 and so positioned that the light from same can pass underneath the lower edges of the baffles to illuminate the copy. The lamps may be supported in any suitable manner on the side walls 31a of the opening 31b in the cabinet. One of the lamps 20 is shown diagrammatically in Figure 12 in this position.

When extensions such as 118 are applied to the baffles, then lamps 20, 22 cannot be used as they are outside the baffles and light from them cannot strike the space therebetween. In this event lamps 20, 21 are placed at each end of the scanning device used such as 25, (Fig. 2) between the ends 46a, 46b of the slot 46 and adjacent parts such as the inner wall of the casing 55. Room at this point is provided for the lamps and they are so positioned that light therefrom will be reflected downward and onto the copy between the baffles in a manner that will be obvious.

Figure 14:
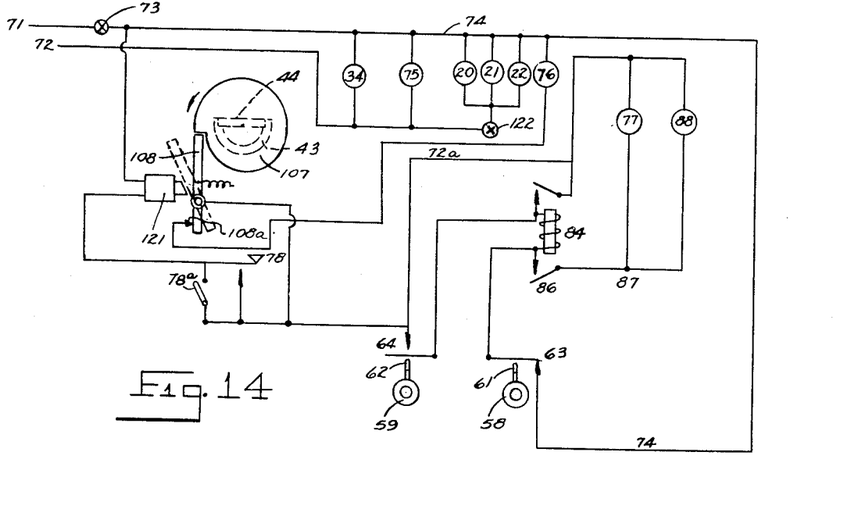
Figure 14 is a wiring diagram of the apparatus Figure 1 with the scanning device of Figure 11 but with the baffle plates omitted for the sake of clearness.

Figure 14 is a wiring diagram of the apparatus when the device shown in Figure 11 is used. The operation is much like the circuits of Figure 8 and like parts have the same numerals.

Assuming it is desired to photograph copy from "0" to "15" on support 30:

The baffle plates 112, 113 are set, as previously described, to define the area to be scanned.

Start-finger 59 is set slightly to the right of "0" on plate 110.

Stop-finger 58 is set at "15" on plate 110.

Switch 73 is closed; signal lamp 76 is illuminated. Switch 78 is closed momentarily, thereby operating the magnet 121 which operates the trip lever 108 of the clutch 107, moving said member from the position shown in solid lines to the position shown in dotted lines. This extinguishes signal lamp 76, the circuit of which is broken at 108a, (Figure 14).

The member 108 releases the trip lever cam 107a of the clutch 107. The clutch now operates to turn the mirror 44 a full revolution through 360 degrees and during this revolution scans the copy on support 30 between the baffles.

The start-finger 59 having been set at "15" operates switch 64 at the proper time to energize relay 84 and operate clutch 77 in the camera to move film 10 therein in timed relation to the movement of the mirror scanning the copy. At the end of the scanned space, the stop-finger 58 operates switch 63 to restore the circuit to waiting position.

Signal lamp 88 and switch 78a operate, as previously described.

If switch 78a is closed, the clutch 107 will operate continuously, but the camera clutch 77 being under the control of switches 63, 64 will only operate to expose film while the mirror is scanning the copy between the baffles 112, 113.

The shutter can be omitted from the camera, if desired, when the device of Figure 11 is used, as no film is exposed except when the mirror is actually scanning copy. When at rest, the mirror frame 43 in the position shown in Figure 12 prevents light passing through the chamber 41c via opening 46 to 47 and vice-versa. The inner surface of chamber 41c and all external parts of the mirror frame 43 are finished in dull black to prevent light reflections, and the chamber 41c is provided with any further desired means to prevent light from passing therethrough except when the mirror 44 forms part of the optical path between the openings 46 and 47.

If desired, the relay 121 can be omitted and the release member 108 of the clutch mechanically moved to operate the clutch. As the necessary lever arrangement to do this is well known it will not be described. Such a modification does not alter the control of the film in the camera.

The description thus far given applies to the apparatus when used as a camera and particularly as a camera for making negative microfilm at 10 from still copy located on the support 30. In all cases synchronous motors are used at 34 and 75 as the film and the scanning mirror must move at fixed relative speeds. Other means such as an interconnected mechanical drive can be used but does not possess the freedom from tremor (nor insure that the developed film will be free from so-called "washboard" effects) as when all gears, belts and other elements liable to introduce vibration, are eliminated.

The apparatus will now be described when used as a projector-enlarger. Obviously, any of the scanner devices Figures 2, 9 or 11 can be employed with but slight differences in their operation or that of their associated control heads. Accordingly, the use of the apparatus as an enlarger will be described in connection with the scanner device Figure 2 and brief reference made to such differences therefrom, as exist when the scanner devices of Figures 7 and 11 are used.

To make an enlargement, the film 10 in the projector head (as fully described and illustrated in the co-pending application 547,131 before mentioned) is driven in the proper direction for projection and contains the usual images. A suitable light source 149 (Fig. 20) projects a beam of light therethrough and through lens 16 along path 24a to mirror 44, which if moved will reflect this light down path 24 to form a strip image on a sensitized sheet held fixed on the support 30 in the focal plane of the lens as previously described.

Referring to Fig. 8, switch 122 is opened to cut off the lamps 20, 21, 22, and if now the switch 78 is operated as previously described, the mirror 44 will flow onto the selected area of the sensitized sheet at 30, whatever image is on the film 10.

If the sensitized paper is moved or flowed across the support in the focal plane of the lens, by any suitable platen mechanism such as that described in the co-pending application Serial Number 547,131 previously mentioned, and in timed relation to the speed of the film 10 (the control head being set with the mirror stationary, by opening normally closed switch 123) switch 78a being closed and the fingers 58, 59 removed from shaft 40 so that switches 63 and 64 are not cyclically operated, the device will operate continuously, transferring the images from the film by reflection (or one continuous image of any length) to the sensitized paper without further attention.

This is accomplished by the use of a synchronous motor to drive the paper feeding mechanism, all as disclosed in the aforesaid application Serial Number 547,131, and a synchronous motor 75 for the film drive in the projector, as disclosed herein.

The shutter 19 may be omitted when the device is used as a projector, as the projector lamp is never illuminated except when in use. If the shutter is used, no light will reach the sensitized paper except when the film is actually moving.

The disc 51 can be set to turn the mirror 44 so that the beam therefrom will lie stationary across the focal plane at 30 at some convenient point— say at 15 on scale 45—and the mirror assembly locked in this position by gear 53 and nut 56, as previously described.

At the completion of a continuous run, as just described, the operation of the device is stopped by opening switch 73, thereby releasing relay 84, as previously described, and stopping the movement of the film.

The operation of the device 89 Figure 9 is much the same when used as a projector-enlarger as the device of Figure 2.

To make an enlargement using the moving mirror, the procedure is as previously described.

If the sensitized paper is flowed across support 30, the procedure is as previously described. The clutch 91, 92 is open as fingers 58, 59 are not used, and the mirror is stationary, the clutch being left in open position as shown in Figure 9.

The operation of the device 106, Figure 11, is much the same when used as a projector-enlarger as the device of Fig. 2.

To make an enlargement using the moving mirror, the procedure is as previously described.

It will be observed that the term "scanning" used herein refers to the action of the mirror 44 (which is an optical beam-deflecting means) in (a) receiving light reflected from copy on support 30 and deflecting said light to the lens 16 when the apparatus is used as a camera to impress images on a moving film, or (b) receiving light from a moving film and deflecting said light to a sensitized surface on said support.

Equivalent optical beam-deflecting means can be used instead of mirror 44.

The term "scanning period" used herein means the period of time during which the mirror 44 is actually reflecting light in either direction in paths 24 and 24a and applies when the apparatus is operating either as a camera or projector-enlarger.

Figure 15:
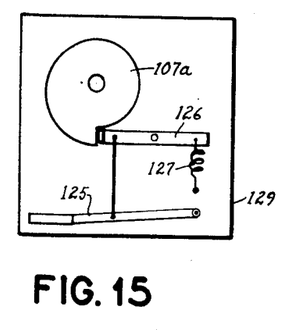
Figures 15 and 16 are diagrams of alternate means of operating a clutch.

Once the inventive concept herein disclosed is understood many obvious modifications in the rearrangement of the control mechanism herein described can be devised. As illustrative of some of these, references is now made to the following figures: In Fig. 15 is shown diagrammatically an arrangement wherein a foot treadle 125 is connected to a trip lever 126, similar to the trip lever 108 previously described. Trip lever 126 is normally tensioned by spring 127 to engage the nose of the trip cam member 107a of the clutch 107.

This arrangement therefore provides a pedal control for the clutch described in connection with Fig. 11.

If it is desired for the clutch to operate continuously then the pedal 125 may be locked down by any suitable known means (not shown).

Figure 16:
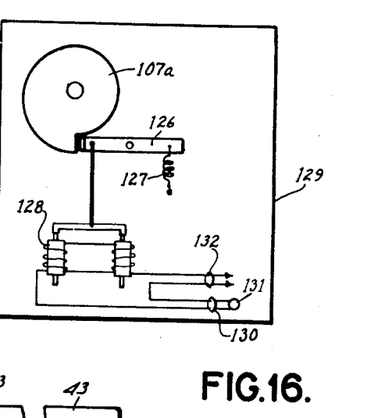

Fig. 16 shows a clutch operated by a solenoid 128. This solenoid together with the clutch and other operating parts are mounted upon or within the apparatus which is generally indicated by the outline 129 but to facilitate the operation of the solenoid, a suitable flexible cord 130 carrying in its outer end the push button control switch 131 may extend from the cabinet frame 129 so that an operator seated in front of the apparatus, Fig. 1, will not have to lean forward in order to operate a button affixed to said apparatus. It will be understood that the wires 132 connected to a suitable source of power or may be connected in the control circuits previously described.

Obviously switch 131 can be a foot switch thus leaving the operator's hands free.

Figure 17:
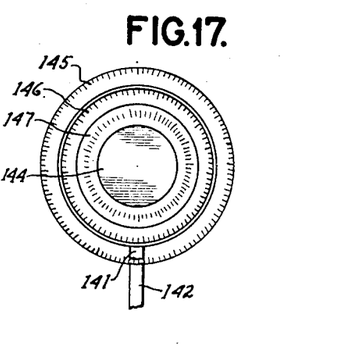
Figures 17, 18 and 19 are diagrams of alternate means of controlling the movement of film in the apparatus.
Figure 18:
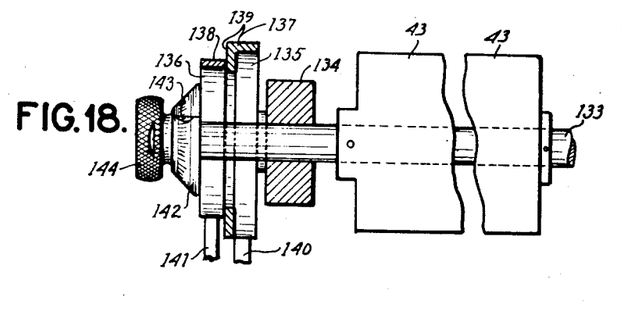
Figure 19:
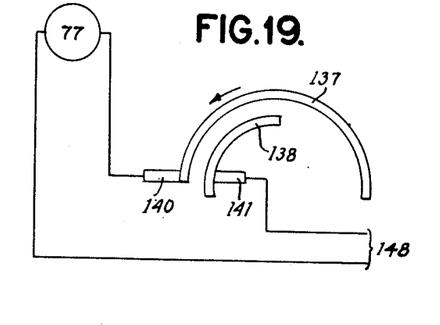

Figs. 17, 18, and 19 show a simplified form of control. Here the shaft 133 is the driving shaft of the clutch and carries the mirror and framework 43, 44. The shaft may be supported in a fixed bearing 134 and carries at its outer or left end in Fig. 17 a pair of contact members 135, 136 which are loosely supported on said shaft so as to be freely movable thereabout. Each of said members carries on its periphery an arcuate contact. The contact member, disc 135, may carry a contact 137 and the disc 136 may carry a contact 138 which is somewhat shorter than 137.

Contact 137 extends down around the outer flat side of disc 135 as indicated at 139 so that when the two discs are placed side by side as shown in Fig. 17, the contacts 137, 138 are in electrical connection with each other.

A pair of brushes 140, 141 are mounted to bear against the contacts 137 and 138. An indicator dial 142 is secured to the shaft 133 to rotate therewith by means of a key 143 but is free to slide longitudinally on the shaft, the outer ends of which are threaded to receive a knob 144.

The outer face of the disc 135 is provided with indicia as shown at 145, the outer face of the disc 136 is provided with indicia as shown at 146, and the outer face of the indicator dial 142 is provided with indicia as shown at 147.

Referring to Fig. 19 the camera clutch 77 being connected as shown in circuit with brushes 140, 141 and their cooperating contacts 137, 138 and the wires at 148 being connected to a suitable source of power that as the shaft 133 is rotated, the operation of the camera clutch 77 will be controlled and that by relatively adjusting the position of contacts 137 and 138 the time at which this clutch is operated to start moving film and to stop said movement can be regulated in relation to the position of the mirror 44 in its sweep over the copy 23, as previously described.

It will be understood that the discs 135, 136 can be locked in any adjusted position in respect to each other and to the shaft 133 by tightening the nut 144 and that the said discs will only be rotated to control film when the clutch 107 is operated to connect shaft 133 to the driving motor.

What is claimed is:

1. In photographic apparatus, a support, a lens having its front focal plane coincident with the surface of said support, a film in the rear focus of said lens, a movable scanning member having a starting position and a scanning period during which period said member forms part of the optical path between said lens and the area of said support scanned thereby to permit images of objects in said area to be photographed on said film and images on said film to be projected to said support, means for determining at what point in said area said member begins its scanning period, a motor, means including an electrically operated clutch for connecting said scanning member to said motor to be moved thereby, and switching means actuated by said motor for controlling said clutch to disconnect said motor from said scanning member.

2. In apparatus having a movable scanning member forming part of the optical path in said apparatus, a casing, a motor within said casing, a clutch within said casing connected to said motor, a shaft in said casing on which said scanning member is supported and to which said clutch is connected, a plate in one end of said casing through which said shaft extends, adjustable control means mounted on said shaft and movable thereabout, and means operated by said control means to cause said clutch to engage and thereby move said scanning member and to disengage and thereby stop the movement of said scanning member dependent upon the adjustment of said control means, said motor being in operation the while.

3. In photographic apparatus, a lens, means defining an area to be scanned, a movable scanning member having a starting position and a scanning period during which period said member forms part of the optical path between said lens and said area scanned thereby, means for determining at what point in said area said member begins its scanning period, a motor, a clutch between said motor and scanning member, control means operated by said motor for operating said clutch to connect and disconnect said motor and scanning member, a film in the back focal plane of said lens, and means for moving said film in timed relation to the movement of said scanning member, said last means being controlled by said control means to start and stop the movement of said film.

4. In apparatus having a movable scanning member forming part of an optical path in said apparatus, a shaft for said member, a plate through which said shaft extends, fingers adjustably secured to the outer end of said shaft and adapted to be fixed in various positions over the outer face of said plate, a motor, a clutch for connecting said motor to said shaft, control means operated by said fingers for operating said clutch, a film, means for moving said film in timed relation to the movement of said scanning member, and control means operated by said fingers for starting and stopping said last means.

5. In apparatus of the class described, a casing forming a chamber and having two longitudinal slots therein, a revolvable mirror in said chamber adapted when in one position to deflect a beam of light entering one slot outwardly through the other slot, and when in another position to act as a light barrier in the optical path between said slots, a lens opposite one of said slots, means for moving a film past the back focus of said lens, a support opposite the other of said slots, and motor means for moving said film and mirror in timed relation whereby during each revolution of said mirror the optical path in said casing is alternately completed and interrupted.

6. The combination as claimed in claim 5 including control means operated by said motor means associated with the film moving means whereby same may be rendered inoperative during a portion of the revolution of said mirror.

7. The combination as claimed in claim 2 including control means operated by said motor whereby the time said film moving means is in operation can be pre-determined for a part of each revolution of the scanning member.

8. In an optical apparatus a support, a lens having its front focal plane co-existent with the surface of said support, a film in the rear focus of said lens, a scanning device including a mirror having a fixed path of movement, means for starting the movement of said device at a predetermined point in said path, said mirror forming part of the optical path of said apparatus during at least a part of its movement whereby images of objects on said support may be photographed on said film and images on said film may be projected to said support, means for stopping the movement of said device at a second pre-determined point in its path of movement, a motor for moving said scanning device, a clutch between said motor and scanning device, said means for stopping the movement of said device at said second predetermined point including a movable arm engaging said clutch to disengage same from said motor.

9. In an optical apparatus having a lens, a support in the front focal plane of said lens, an oscillating scanning mirror adapted to scan said support and forming part of the optical path between said support and said lens during a part of its movement, a circuit including a relay, a switch in circuit with said relay, said relay having a pair of normally open contacts bridging said switch to disable same when said relay is energized by closing said switch, a second pair of normally open contacts adapted to be closed when said relay is energized, a motor, a second relay controlled by said second pair of contacts, and means for moving a film past said lens in the back focus thereof controlled by said second relay to permit images of objects on said support to be photographed on said film and images on said film to be projected to said support.

10. In an optical apparatus having a lens, a support in the front focal plane of said lens, an oscillating scanning mirror adapted to scan said support and forming part of the optical path between said lens and support during a part of its movement, a motor for oscillating said mirror, a circuit including a relay, a switch in circuit with said relay having normally open contacts controlling said switch to disable same after said relay is energized, a second pair of contacts adapted to be closed when said relay is energized, a clutch between said motor and mirror controlled by said second pair of contacts, means for moving a film past said lens in the back focus of same controlled by said second relay, a starting switch operated by said first motor to control said second relay, and a stopping switch operated by said motor to control both said relays to permit images of objects on said support to be photographed on said film and images on said film to be projected on said support.

11. In an optical apparatus having a lens, a support in the front focal plane of said lens, an oscillating scanning mirror adapted to scan said support and forming part of the optical path between said lens and support during a part of its movement, a shaft movable in timed relation to said mirror, a motor for oscillating said mirror, a circuit including a relay, a switch in circuit with said relay having normally open contacts controlling said switch to disable same after said relay is energized, a second pair of contacts adapted to be closed when said relay is energized, a clutch between said motor and mirror controlled by said second pair of contacts, and means for moving a film past said lens in the back focus of same controlled by said second relay, a pair of fingers adjustably secured to said shaft, a starting switch operated by one of said fingers to control said second relay, and a stopping switch operated by the other of said fingers to control both said relays to permit images of objects on said support to be photographed on said film and images on said film to be projected on said support.

12. In an apparatus of the class described, a lens, motor means for moving film transverse the axis of said lens, a second motor, scanning means operable by said second motor, a clutch between said second motor and scanning means, a shaft driven by said clutch, control means including a pair of contact discs angularly adjustable about said shaft for controlling the operation of said film moving means, and a circuit including said contacts and said first motor.

13. In an apparatus of the class described, a lens, motor means for moving film transverse the axis of said lens, a motor, scanning means operable by said motor, a clutch between said motor and said scanning means, a shaft operated by said clutch contact means operated by said shaft and angularly adjustable thereabout for electrically controlling the operation of said first motor, and a circuit including a source of current, said contact means and said first motor.

14. In apparatus of the class described, a support, a lens adapted to have its front focal plane focussed on objects on said support, a film in the rear focus of said lens, means for moving said film transverse the axis of said lens, a movable scanning device adapted to form part of the optical path between said lens and support, a motor for driving said scanning device, a clutch between said scanning device and said motor, a shaft extending from said scanning device, a control finger carried by said shaft and adjustable thereabout, and means operated by said finger for controlling said clutch.

15. In apparatus having a movable scanning member forming part of the optical path in said apparatus, a casing, a motor within said casing, a clutch within said casing connected to said motor, a shaft in said casing on which said scanning member is supported and to which said clutch is connected, a plate in one end of said casing through which said shaft extends, adjustable control means mounted on said shaft and movable thereabout, and means including an arm extending through said plate and operated by said control means to cause said clutch to engage and thereby move said scanning member and to disengage and thereby stop the movement of said scanning member depending upon the adjustment of said control means, said motor being in operation the while.

16. In apparatus having a movable scanning member forming part of the optical path in said apparatus, a casing, a motor within said casing, a clutch within said casing connected to said motor, a shaft in said casing on which said scanning member is supported and to which said clutch is connected, a plate in one end of said casing through which said shaft extends, adjustable control means mounted on said shaft and movable thereabout, means operated by said control means to cause said clutch to engage and thereby move said scanning member and to disengage and thereby stop the movement of said scanning member dependent upon the adjustment of said control means, said motor being in operation the while, and a film and means for moving said film in timed relation to the movement of said scanning member, said last means being controlled by said adjustable control means on said shaft.

17. In apparatus having a movable scanning member forming part of the optical path in said apparatus, a casing, a motor within said casing, a clutch within said casing connected to said motor, a shaft in said casing on which said scanning member is supported and to which said clutch is connected, a plate in one end of said casing through which said shaft extends, adjustable control means mounted on said shaft and movable thereabout, and means operated by said control means to cause said clutch to engage and thereby move said scanning member and to disengage and thereby stop the movement of said scanning member dependent upon the adjustment of said control means, said motor being in operation the while, said plate being adjustable about said shaft, said plate and shaft being in engagement whereby movement of said plate is communicated to said shaft and the scanning member thereon to change the angular position of said scanning member relative to said casing.

VERNEUR E. PRATT.
GEORGE F. GRAY.

REFERENCES CITED

The following references are of record in the file of this patent:

UNITED STATES PATENTS

| Number | Name | Date |
|---|---|---|
| 1,246,217 | Andersen | Nov. 13, 1917 |
| 1,265,715 | Tomlinson | May 7, 1918 |
| 1,283,577 | Sloman | Nov. 5, 1918 |
| 1,987,064 | Hopkins | Jan. 8, 1935 |
| 2,124,802 | Wallace | July 26, 1938 |
| 2,177,135 | Fassel | Oct. 24, 1939 |
| 2,333,768 | Davies | Nov. 9, 1943 |